US009694528B2

(12) United States Patent
Sarkar et al.

(10) Patent No.: US 9,694,528 B2
(45) Date of Patent: Jul. 4, 2017

(54) METHOD FOR FORMING A LAYERED TUBE AND LAYER THEREIN

(71) Applicants: Eaton Corporation, Cleveland, OH (US); AGC Chemicals Americas, Inc., Exton, PA (US)

(72) Inventors: Soumayajit Sarkar, Farmington Hills, MI (US); Javed Mapkar, Farmington Hills, MI (US); Edward Hummelt, Greenfield, WI (US); Kenneth Phaneuf, Chelsea, MI (US); Robert Michael Lefere, Jackson, MI (US); Joseph David Proof, Glenmorre, PA (US); Gregory James Chapman, Parkesburg, PA (US)

(73) Assignee: EATON CORPORATION, Cleveland, OH (US)

( * ) Notice: Subject to any disclaimer, the term of this patent is extended or adjusted under 35 U.S.C. 154(b) by 385 days.

(21) Appl. No.: 14/275,456

(22) Filed: May 12, 2014

(65) Prior Publication Data

US 2014/0251532 A1 Sep. 11, 2014

Related U.S. Application Data (63) Continuation-in-part of application No. 14/143,519, filed on Dec. 30, 2013.

(Continued)

(51) Int. Cl.
*B29C 47/00* (2006.01)
*B29D 23/00* (2006.01)
(Continued)

(52) U.S. Cl.
CPC ...... *B29C 47/0026* (2013.01); *B29C 47/0004* (2013.01); *B29C 47/0021* (2013.01);
(Continued)

(58) Field of Classification Search
CPC ... B29C 47/00; B29C 47/002; B29C 47/0026; B29C 47/0004; B29C 47/0021;
(Continued)

(56) References Cited

U.S. PATENT DOCUMENTS 4,887,647 A 12/1989 Igarashi et al.
5,647,400 A 7/1997 Jani et al.
(Continued)

FOREIGN PATENT DOCUMENTS

| JP | S63284250 A | 11/1988 |
|----|-------------|---------|
| WO | 2005035650 A2 | 4/2005 |
| WO | 2014113202 A1 | 5/2006 |

OTHER PUBLICATIONS

International Search Report from PCT/US2014/037604, dated Sep. 19, 2014.

*Primary Examiner* — Michael N Orlando
*Assistant Examiner* — Matthew Hoover
(74) *Attorney, Agent, or Firm* — Benesch Friedlander Coplan & Aronoff LLP (57) ABSTRACT

A method includes premixing an anti-static additive and a first crosslinker to form an anti-static intermediate mixture where the anti-static additive is dispersed in the first crosslinker. The method also includes compounding the anti-static intermediate mixture and at least a portion of the first fluoropolymer to form a first compounded mixture. The method further includes extruding the first compounded mixture to form a layer.

29 Claims, 3 Drawing Sheets

Related U.S. Application Data (60) Provisional application No. 61/822,016, filed on May 10, 2013, provisional application No. 61/746,840, filed on Dec. 28, 2012.

(51) Int. Cl.

| | | |
|---|---|---|
| *F16L 11/00* | (2006.01) | |
| *B29C 47/06* | (2006.01) | |
| *F16L 11/08* | (2006.01) | |
| *B29K 27/12* | (2006.01) | |
| *B29L 7/00* | (2006.01) | |
| *B29L 9/00* | (2006.01) | |
| *B29L 23/00* | (2006.01) | |
| *B29C 53/56* | (2006.01) | |

(52) U.S. Cl.
CPC ........ *B29C 47/0064* (2013.01); *B29C 47/065* (2013.01); *B29D 23/001* (2013.01); *F16L 11/081* (2013.01); *F16L 11/082* (2013.01); *F16L 11/085* (2013.01); *F16L 11/086* (2013.01); *B29C 53/562* (2013.01); *B29K 2027/12* (2013.01); *B29L 2007/00* (2013.01); *B29L 2009/00* (2013.01); *B29L 2023/005* (2013.01)

(58) Field of Classification Search
CPC ... B29C 47/006; B29C 47/0064; B29C 47/06; B29C 47/065; B29D 23/00; B29D 23/001; F16L 11/00; F16L 11/08; F16L 11/08; F16L 11/081; F16L 11/082; F16L 11/083; F16L 11/084; F16L 11/085; F16L 11/086
See application file for complete search history.

(56) References Cited

U.S. PATENT DOCUMENTS

| | | |
|---|---|---|
| 6,024,133 A | 2/2000 | Kodama et al. |
| 6,089,277 A | 7/2000 | Kodama et al. |
| 6,849,314 B2 | 2/2005 | Jing et al. |
| 7,568,505 B2 | 8/2009 | Sakazaki et al. |
| 2002/0106470 A1* | 8/2002 | Merziger .................. B32B 1/08 428/36.91 |
| 2004/0187948 A1 | 9/2004 | Shifman |
| 2005/0054777 A1 | 3/2005 | Lee |
| 2006/0099368 A1* | 5/2006 | Park .......................... B32B 1/08 428/36.91 |
| 2007/0227610 A1 | 10/2007 | Sakazaki |
| 2012/0073696 A1* | 3/2012 | Terada .................... F16L 11/06 138/177 |
| 2013/0192676 A1 | 8/2013 | Gaw et al. |
| 2014/0246110 A1 | 9/2014 | Sarkar et al. |

\* cited by examiner

METHOD FOR FORMING A LAYERED TUBE AND LAYER THEREIN

CROSS REFERENCE TO RELATED APPLICATIONS

This application claims the benefit of U.S. Provisional Application Ser. No. 61/822,016, filed on May 10, 2013, the disclosure of which is hereby incorporated by reference in its entirety. Additionally, this application is a continuation-in-part of application Ser. No. 14/143,519, filed on Dec. 30, 2013, which claims the benefit of U.S. Provisional Application Ser. No. 61/746,840, filed on Dec. 28, 2012, the disclosures of which are hereby incorporated by reference in their entirety.

FIELD OF THE INVENTION

The present invention generally relates to a layered tube for directing a hydraulic fluid, and also to an individual layer, which may be used in the layered tube. The layered tube and the layer may be used as components in hose assemblies.

BACKGROUND

Conventional hose assemblies are known to convey fluids in many industries. As one example, in the aerospace industry, the hose assemblies typically include a layered tube and are commonly required to be flexible and able to withstand repeated thermal cycling with wide temperature variations (e.g. between −65° F. to 275° F. (between −55° C. and 135° C.)) during continued exposure to aggressive hydraulic fluids (e.g. SKYDROL®) and high pressure (e.g. 5,000 psi). The conventional hose assemblies, in particular the layered tube of the conventional hose assemblies, may begin to show visible signs of wear after prolonged exposure to repeated thermal cycling during exposure to the aggressive hydraulic fluids and high pressure (e.g. 5,000 psi), particularly at locations where the conventional hose assemblies are flexed or bent. More specifically, conventional hose assemblies may develop white markings or "stress" markings which typically first occur in locations where the conventional hose assembly is flexed or bent. In general, when observed at microscopic levels, these stress markings contain microscopic voids or holes. Conventional hose assemblies that have these stress markings may allow a small amount of the hydraulic fluid to migrate or seep (i.e., leak) through the microscopic voids in the conventional hose assemblies. Dust may collect on the surface of the conventional hose assemblies if the hydraulic fluid migrates or seeps through the convention hose assemblies. In the aerospace industry, conventional hose assemblies that experience leakage and/or collect dust on the surface are undesirable. As such, there remains an opportunity to develop an improved hose assembly and improved components thereof.

SUMMARY OF THE INVENTION AND ADVANTAGES

The present disclosure provides a method for forming a layer. The method also forms a layered tube with the layer as part of the layered tube. The method comprises premixing an anti-static additive and a first crosslinker to form an anti-static intermediate mixture where the anti-static additive is dispersed in the first crosslinker. The method also includes compounding the anti-static intermediate mixture and at least a portion of the first fluoropolymer to form a first compounded mixture. The method further includes extruding the first compounded mixture to form the layer.

The layer formed by the method of this disclosure, and the layered tube including the layer, are both flexible and suitable for use in the aerospace industry. When included as a component in a hose assembly, the layered tube does not show visible signs of wear after repeated thermal cycling during exposure to aggressive hydraulic fluids and high pressure. As such, the layered tube does not leak nor does the layered tube develop the white, or stress, markings including the microscopic voids.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION OF THE INVENTION

Figure 1:
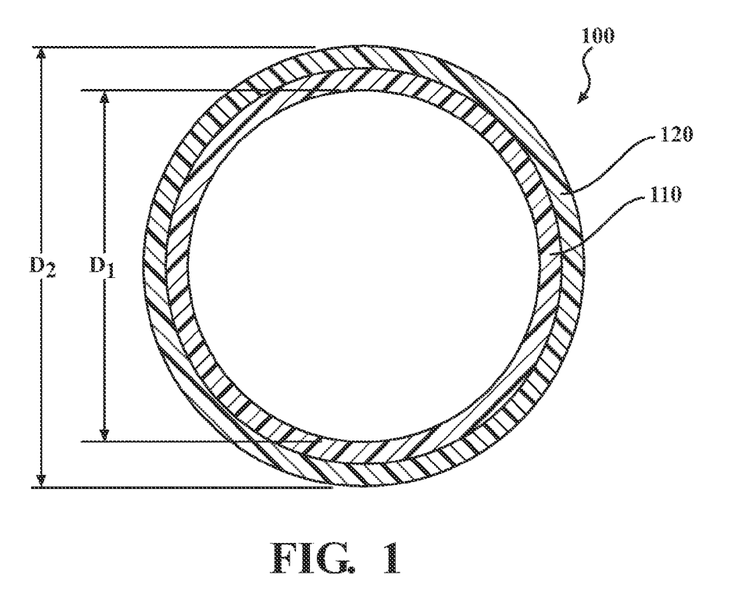
FIG. 1 is a cross sectional view of a layered tube.

As shown in FIG. 1, a layered tube 100 for directing a hydraulic fluid comprises a layer 110 and an outer layer 120. The layer 110 defines a chamber for directing a hydraulic fluid. Typically, the hydraulic fluid is highly pressurized (e.g. 5,000 psi) and chemically aggressive. An example of such a hydraulic fluid is SKYDROL®.

The layer 110 of the layered tube 100 may also be referred to as an inner liner, a backing layer, an inner layer, an inner most layer, a first layer, or an inner most tube. Likewise, the outer layer 120 may also be referred to as a second layer, an inner layer, an inner tube, or a second tube. In general, when the layer 110 is referred to as the inner liner, the outer layer 120 is referred to as the inner tube. For ease of reference, the layer 110 will only be referred to as the layer 110 hereinafter. Likewise, the outer layer 120 will only be referred to as the outer layer 120 hereinafter.

The layer 110 comprises a first fluoropolymer present in an amount greater than 60 parts by weight based on 100 parts by weight of the layer 110. The layer 110 also comprises a first crosslinker present in an amount of from about 1 to about 10 parts by weight based on 100 parts by weight of the layer 110. The layer 110 also comprises an anti-static additive present in an amount of from about 0.4 to about 4.0 parts by weight based on 100 parts by weight of the layer 110. The first fluoropolymer, the first crosslinker, and the antistatic additive are described in detail below.

The outer layer 120 comprises a second fluoropolymer present in an amount greater than 60 parts by weight based on 100 parts by weight of the outer layer 120. Although not required, the outer layer 120 may also comprise a third fluoropolymer that is different than the second fluoropolymer. The second fluoropolymer and the third fluoropolymer are also described in detail below.

Figure 2:
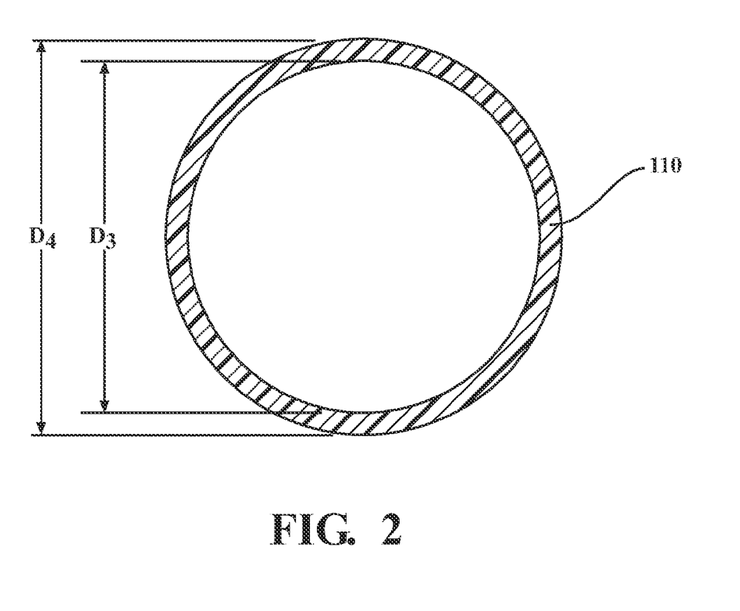
FIG. 2 is a cross sectional view of an embodiment of a layer.

Referring back to the layer 110, as best shown in FIG. 2, the layer 110 defines a chamber for directing the hydraulic fluid. The layer 110 has an inner diameter D1 and an outer diameter D2. The inner and outer diameter D1, D2 can vary depending upon the particular fluid conveying application involved.

As described above, the layer 110 comprises the first fluoropolymer present in an amount greater than 60 parts by weight based on 100 parts by weight of the layer 110. Alternatively, the layer 110 may comprise the first fluoropolymer present in an amount of from about 60 to about 98.6, from about 60 to about 87, from about 65 to about 95, from about 65 to about 87, or from about 70 to about 80, parts by weight based on 100 parts by weight of the layer 110.

A fluoropolymer is a polymer that contains multiple instances of bonds between fluorine and carbon. The fluoropolymer includes materials that may generally be referred to as fluoroelastomeric materials, such as fluorocarbon-based synthetic rubbers. The fluoropolymer is also generally melt processable during primary extrusion and capable of being crosslinked when exposed to sufficient conditions, which are described below.

In certain embodiments, the first fluoropolymer comprises poly(ethylene-tetrafluoroethylene) (ETFE). In other embodiments, the first fluoropolymer comprises poly(tetrafluoroethylene-co-perfluoroalkoxyethylene) (PFA). ETFE is a copolymer comprising a reaction product of ethylene and tetrafluoroethylene. PFA is a copolymer comprising a reaction product of tetrafluoroethylene and perfluoroalkoxyethylene. Typically, the first fluoropolymer comprises ETFE.

When the first fluoropolymer comprises ETFE, various grades of ETFE may be used. For example, ETFE may have a melt point of from about 200 to about 265° C. according to Differential Scanning Calorimetry (DSC). ETFE may also have a melt flow rate of from about 5 to about 50, of from about 10 to about 40, of from about 15 to about 30, or of from about 20 to about 25, grams per ten minutes (g/10 min) according to ASTMD-3159. ETFE may also have a tensile strength of from about 35 to about 50 MPa at 23° C. according to ASTM-D638. ETFE may also have a tensile elongation of from about 360 to about 450 percent at 23° C. according to ASTM-D638. ETFE may also have a flex modulus of from about 600 to about 900 MPa at 23° C. according to ASTM-D790. Suitable grades of ETFE are commercially available from AGC under the trade name FLUON®, such as FLUON® ETFE and FLUON® LM-ETFE. ETFE may be provided in any form, such as a pellet, bead, and/or powder.

In other embodiments when the first fluoropolymer comprises PFA, various grades of PFA may be used. For example, PFA may have a melt point of from about 300 to about 320° C. according to DSC. PFA may also have a melt flow rate of from about 2 to about 30 g/10 min according to ASTMD-3159. PFA may also have a tensile strength of from about 35 to about 50 MPa at 23° C. according to ASTM-D638. PFA may also have a tensile elongation of from about 320 to about 460 percent at 23° C. according to ASTM-D638. PFA may also have a flex modulus of from about 80,000 to about 110,000 psi at 23° C. according to ASTM-D790. PFA may be provided in any form, such as a pellet, bead, and/or powder.

As described above, the layer 110 also comprises the first crosslinker present in an amount of from about 1 to about 10 parts by weight based on 100 parts by weight of the layer 110. Alternatively, the layer 110 comprises the first crosslinker present in an amount of from about 1 to about 9, from about 2 to about 8, from about 2 to about 7, from about 3 to about 6, or from about 4 to about 5, parts by weight based on 100 parts by weight of the layer 110.

The first crosslinker may be present in an unreacted form in the layer 110. In other words, although the first crosslinker may be capable of reacting, the first crosslinker is not required to have reacted when present in the layer 110. Alternatively, the layer 110 may comprise the reaction product of the first crosslinker and the first fluoropolymer. As such, in embodiments where the first fluoropolymer is ETFE, the layer 110 may comprise the reaction product of ETFE and the first crosslinker.

In embodiments where the layer 110 comprises the first crosslinker in unreacted form, it is to be appreciated that the first crosslinker may still be capable of reacting if exposed to sufficient conditions, such as high heat or other sources of energy. For example, in one embodiment, the layer 110 comprises the first fluoropolymer and the first crosslinker in unreacted form, and after some period of time (e.g. 7 days) the layer 110 is exposed to an electron beam. After exposure to the electron beam, the layer 110 comprises the reaction product of the first fluoropolymer and the first crosslinker (i.e., the first crosslinker has reacted with the first fluoropolymer such that the layer 110 no longer comprises the first crosslinker in the unreacted form).

Typically, the first crosslinker is a triallyl derivative of cyanuric acid. In one embodiment, the triallyl derivative of cyanuric acid is triallyl isocyanurate (TAIC). In another embodiment, the triallyl derivative of cyanuric acid comprises TAIC, triallyl cyanurate (TAC), trimethallyl isocyanurate (TMAIC), or combinations thereof. Typically, when the first fluoropolymer is ETFE, the first crosslinker is TAIC.

As described above, the layer 110 also comprises the anti-static additive present in an amount of from about 0.4 to about 3 parts by weight based on 100 parts by weight of the layer 110. Alternatively, the anti-static additive may be present in an amount of from about 0.4 to about 2.8, from about 0.4 to about 2.6, from about 0.4 to about 2.4, from about 0.4 to about 2.0, from about 0.4 to about 1.8, from about 0.6 to about 1.6, from about 0.6 to about 1.5, from about 0.6 to about 1.4, or from about 0.8 to about 1.2, or about 1.0, parts by weight based on 100 parts by weight of the layer 110.

In general, the anti-static additive is conductive and establishes the electrical conductivity or electrical resistivity of the layer 110. In other words, the anti-static additive establishes or increases the electrical conductivity or the layer 110. Or in even different words, the anti-static additive establishes or decreases the electrical resistivity of the layer 110. Increasing the electrical conductivity of the layer 110 is generally desirable when the layer 110 is in contact with a hydraulic fluid that is flammable. More specifically, increasing the electrical conductivity of the layer 110 allows the layer 110 to dissipate static electricity, which prevents the hydraulic fluid from igniting. It is to be appreciated that although the anti-static additive generally increases the conductivity of the layer 110, the layer 110 is not "truly" conductive. In other words, the electrical conductivity of the layer 110 is increased to a level that enables the layer 110 to dissipate a static charge, but the electrical conductivity is not increased to a level that enables the layer 110 to conduct a continuous flow of electricity. However, it is to be appreciated that despite the fact that the layer is not truly conductive, the layer 110 may be referred to as conductive.

Typically, the anti-static additive comprises carbon nanotubes. In certain embodiments, the carbon nanotubes are present in an amount of from about 0.4 to about 4.0 parts by weight based on 100 parts by weight of the layer 110. Alternatively, the carbon nanotubes may be present in an amount of from about 0.6 to about 3.5, from about 0.6 to about 2.5, from about 0.6 to about 2.0, from about 0.6 to about 1.5, or from about 0.8 to about 1.4, parts by weight based on 100 parts by weight of the inner layer 110. It will be appreciated by a person of skill in the art, that any suitable carbon nanotube material may be used.

In certain embodiments, the layer 110 has an electrical resistivity of from about 10KΩ to about 100MΩ. The electrical resistivity may be measured using industry standard test procedures. Alternatively, the layer 110, has an electrical resistivity of from about 100KΩ to about 80MΩ, alternatively, from about 150KΩ to about 40MΩ, alternatively from about 250KΩ to about 30MΩ, alternatively, from about 400KΩ to about 10MΩ, alternatively, from about 700KΩ to about 5MΩ, alternatively, from about 1MΩ to about 4MΩ, or alternatively, from about 2MΩ to about 3MΩ. In general, the electrical resistivity of the layer 110 is capable of dissipating a static electric charge. In certain embodiments where the antistatic additive comprises carbon nanotubes, the carbon nanotubes are particularly advantageous because the electrical conductivity described above (which is evaluated by measuring the electrical resistivity of the layer 110) can be achieved with a relatively low amount of carbon nanotubes. Specifically, using carbon nanotubes is advantageous because the layer 110 has an electrical resistivity of from about 10KΩ to about 100MΩ, such that the layer 110 is capable of dissipating a static electric charge, with the carbon nanotubes only being present in an amount of from about 0.4 to about 4.0 parts by weight based on 100 parts by weight of the layer 110. Moreover, in certain embodiments, the layer 110 has an electrical resistivity of from about 10KΩ to about 100MΩ with the carbon nanotubes only being present in an amount of from about 0.6 to about 2.5 parts by weight based on 100 parts by weight of the layer 110. Because the carbon nanotubes are present at a maximum of 4 parts by weight, the layer 110 largely possesses the mechanical properties of the first fluoropolymer, the first crosslinker, and any additional components (which are described in detail below). As such, the mechanical properties of the layer 110, are almost entirely derived from the first fluoropolymer, the first crosslinker, and, if present, any additional components. Conversely, conventional layers that contain an anti-static additive require significantly more anti-static additive to achieve the electrical resistivity described above. As a result, the mechanical properties of the conventional layers derive are negatively impacted by the inclusion of higher amounts of antistatic additive.

In certain embodiments, the layer 110 has an excellent tensile strength. Without being held to any particular theory, it is believed that the tensile strength is driven by the first fluoropolymer and is proportional to the relatively low amount of anti-static additive included in the layer 110. In other words, the excellent tensile strength is generally due to the first fluoropolymer, the first crosslinker, and the anti-static additive and their amounts in the layer 110, particularly the relatively high amount of the first fluoropolymer and the relatively low amount of the anti-static additive.

In another embodiment, the anti-static additive comprises carbon powder. Typically, the carbon powder is obtained from the thermal decomposition of acetylene. Suitable grades of carbon powder are commercially available, for example, from Cabot Corporation under the trade name VULCAN® XC72.

The layer 110 may also comprises an additional fluoropolymer that, for descriptive purposes, is described throughout as a fourth fluoropolymer. When the layer 110 comprises the fourth fluoropolymer, the fourth fluoropolymer is different than the first fluoropolymer. When present in the layer 110, the fourth fluoropolymer is present in an amount of from about 5 to about 30 parts by weight based on 100 parts by weight of the layer 110. Alternatively, the fourth fluoropolymer may be present in an amount of from about 5 to about 25, from about 10 to about 20, or about 15, parts by weight based on 100 parts by weight of the layer 110.

In certain embodiments, the fourth fluoropolymer comprises ETFE. In other embodiments, the fourth fluoropolymer comprises PFA. In other embodiments, the fourth fluoropolymer comprises poly(propylene-tetrafluoroethylene) (TFE/P). TFE/P is a copolymer comprising a reaction product of tetrafluoroethylene and propylene. Typically, the fourth fluoropolymer is TFE/P. In other embodiments, when the first fluoropolymer is not ETFE, the fourth fluoropolymer comprises ETFE. In other embodiments, when the first fluoropolymer is not PFA, the fourth fluoropolymer comprises (PFA). Although not required, generally the first fluoropolymer is ETFE and the fourth fluoropolymer is TFE/P.

When the fourth fluoropolymer comprises TFE/P, the layer 110 may comprise various grades of TFE/P. For example, TFE/P may have a fluorine content of from about 45 to about 60 parts by weight fluorine based on 100 parts by weight of TFE/P. TFE/P may also have a storage modulus of from about 80 to about 550, of from about 150 to about 400, or about 300, each measured with a Rubber Process Analyzer (RPA) at 100° C. and 50 cpm. TFE/P may also have a glass transition temperature of from about −5 to about 5° C. In addition, the TFE/P may be a fully saturated TFE/P or contain portions of unsaturation. Typically, a saturated TFE/P may be particularly suitable when small particle sizes of TFE/P are desired, such as TFE/P in the form of a powder. Suitable grades of TFE/P are commercially available from Asahi Glass Company Ltd. under the trade name TFE/P®.

When the fourth fluoropolymer comprises ETFE, various grades of ETFE may be used, such as the various grades of ETFE described above. When the fourth fluoropolymer comprises PFA, various grades of PFA may be used, such as the various grades of PFA described above.

In embodiments where the layer 110 comprises the fourth fluoropolymer, the layer 110 may also comprise the reaction product of the first fluoropolymer, the fourth fluoropolymer, and the first crosslinker. Although not required in these embodiments, typically, the first fluoropolymer is ETFE, the fourth fluoropolymer is TFE/P, the first crosslinker is TAIC, and the antistatic additive comprises carbon nanotubes.

In certain embodiments, the layer 110 consists essentially of the carbon nanotubes, the first fluoropolymer, the fourth fluoropolymer, and the first crosslinker. "Consists essentially of," as used herein relative to the layer 110, allows for the inclusion of other components at a total combined amount of 5 parts by weight or less, based on 100 parts by weight of the outer layer 120, provided that the inclusion of the other components do not materially affect the performance of the layer 110 to transport a hydraulic fluid, particularly a flammable hydraulic fluid under high pressure, while maintaining flexibility. Although not required in these embodiments, typically, the first fluoropolymer is ETFE, the fourth fluoropolymer is TFE/P, the first crosslinker is TAIC, and the first crosslinker is present in the unreacted form.

In certain embodiments, the layer 110 consists essentially of the carbon nanotubes, the first fluoropolymer, the fourth fluoropolymer, and the first crosslinker. In these certain embodiments, the first fluoropolymer is present in an amount of from about 70 to about 90 parts by weight, the fourth fluoropolymer is present in an amount of from about 5 to about 25 parts by weight, the first crosslinker is present in an amount of from about 2 to about 6 parts by weight, each based on 100 parts by weight of the layer 110. Although not required in these embodiments, typically, the first fluoropolymer is ETFE, the fourth fluoropolymer is TFE/P, the first crosslinker is TAIC, and the first crosslinker is present in the unreacted form. Although not required, typically the carbon nanotubes are present in an amount of from about 0.6 to about 3.5 parts by weight, based on 100 parts by weight of the layer 110.

In certain embodiments, the layer 110 comprises a reaction product present in an amount of from about 96 to 99.4 parts by weight based on 100 parts by weight of the layer 110 and carbon nanotubes present in an amount of from about 0.6 to about 1.5 parts by weight based on 100 parts by weight of the layer 110. In these certain embodiments, the reaction product is formed from the first fluoropolymer present in an amount of from about 70 to about 90 parts by weight, the fourth fluoropolymer present in an amount of from about 5 to about 25 parts by weight, and the first crosslinker present in an amount of from about 2 to about 6 parts by weight, each based on 100 parts by weight of the layer 110. Although not required in these embodiments, typically, the first fluoropolymer is ETFE, the fourth fluoropolymer is TFE/P, the first crosslinker is TAIC, and the antistatic additive comprises carbon nanotubes.

In certain embodiments, the layer 110 consists essentially of the carbon nanotubes and a reaction product of the first fluoropolymer, the fourth fluoropolymer, and the first crosslinker. Although not required in these embodiments, typically, the first fluoropolymer is ETFE, the fourth fluoropolymer is TFE/P, and the first crosslinker is TAIC.

In certain embodiments, the layer 110 comprises a reaction product present in an amount of from about 96 to 99.4 parts by weight based on 100 parts by weight of the layer 110 and carbon nanotubes present in an amount of from about 0.6 to about 1.5 parts by weight based on 100 parts by weight of the layer 110. In these certain embodiments, the reaction product is formed from the first fluoropolymer present in an amount of from about 70 to about 90 parts by weight, the fourth fluoropolymer present in an amount of from about 5 to about 25 parts by weight, and the first crosslinker present in an amount of from about 2 to about 6 parts by weight, each based on 100 parts by weight of the layer 110. Although not required in these embodiments, typically, the first fluoropolymer is ETFE, the fourth fluoropolymer is TFE/P, the first crosslinker is TAIC, and the antistatic additive comprises carbon nanotubes.

In certain embodiments, the layer 110 consists essentially of a reaction product present in an amount of from about 96 to 99.4 parts by weight based on 100 parts by weight of the layer 110 and carbon nanotubes present in an amount of from about 0.6 to about 1.5 parts by weight based on 100 parts by weight of the layer 110. In these certain embodiments, the reaction product is formed from the first fluoropolymer present in an amount of from about 70 to about 90 parts by weight, the fourth fluoropolymer present in an amount of from about 5 to about 25 parts by weight, and the first crosslinker present in an amount of from about 2 to about 6 parts by weight, each based on 100 parts by weight of the layer 110. Although not required in these embodiments, typically, the first fluoropolymer is ETFE, the fourth fluoropolymer is TFE/P, the first crosslinker is TAIC, and the antistatic additive comprises carbon nanotubes.

The layer 110 may also comprise a plurality of additives. The additives may include pigments, leveling/flow aids, fillers, fibers, and the like. The additives may be present in an amount from about 0.1 to about 10, of from about 2 to about 8, or from about 4 to about 6, based on 100 parts by weight of the layer 110.

In embodiments where the layer 110 comprises the reaction product of the first fluoropolymer, the first crosslinker and optionally, the fourth fluoropolymer, the reaction products may be produced by subjecting the layer 110 to radiation or other sources of energy sufficient to produce a free radical. In certain embodiments, the layer 110 is subjected to radiation via electron beam. Without being held to any particular theory, an electron beam is beneficial for forming the reaction product because the electron beam creates free radicals and may also create unsaturation (i.e., reaction sites) in the first and/or fourth fluoropolymer.

In certain embodiments, the layer 110 comprises a polymeric component present in an amount of from about 91 to 96 parts by weight based on 100 parts by weight of the layer 110. In these embodiments, the layer 110 also comprises the anti-static additive present in an amount of from about 0.4 to about 3 parts by weight based on 100 parts by weight of the layer 110. In these embodiments, the layer 110 also comprises the first crosslinker present in an amount of from about 1 to about 6 parts by weight based on 100 parts by weight of the layer 110. In these embodiments, the layer 110 also has an electrical resistivity of from about 10KΩ to about 100MΩ. Those of ordinary skill in the art would appreciate how to measure the electrical resistivity. The polymeric component comprises the first fluoropolymer. Typically, the first fluoropolymer is present in an amount greater than 60 parts by weight based on 100 parts by weight of the layer 110. The polymeric component may also comprise other polymers which includes, but is not limited to, polyvinyl chloride, polyesters, acrylics, rubbers (e.g. styrene butadiene), and the like. If the polymeric component contains other polymers, the selection of the other polymers is typically driven based on the particular fluid conveying application (e.g. temperature, pressure, etc.).

As best shown in FIG. 1, the present disclosure also provides a layered tube 100 having the layer 110 as described above and an outer layer 120. Like the layer 110, the layered tube 100 is flexible and suitable for use in the aerospace industry.

As described above, layered tube 100 comprises the layer 110 and the outer layer 120. The layered tube 100 may contain any embodiment of the layer 110 described above. As described herein, the layer 110 and the outer layer 120 cooperate to establish the performance of the layered tube 100. Specifically, the chemical make-up of the layer 110 and the outer layer 120 surprisingly and unexpectedly achieve a cooperative balance that allows the layered tube 100 to be flexible and able to receive the typical components commonly used in conventional hoses, and also be able to transport flammable hydraulic fluids, particularly aggressive and highly pressurized flammable hydraulic fluids, during repeated thermal cycling. As such, the chemical make-up and cooperative nature of the layer 110 and outer layer 120 allows the layered tube 100 to be used in environments where conventional hoses either immediately fail or quickly begin to shows visible signs of failure (e.g. "white marks").

In basic dimensions, the layered tube 100 extends axially to a predetermined length along a central longitudinal axis and has an inner diameter D3 and outer diameter D4. The dimensions of the inner diameter D3 and the outer diameter D4 can vary depending upon the particular fluid conveying application involved. In certain embodiments, the inner diameter D3 is typically from about 0.150 to about 1.100 inches. In these embodiments, the layer 110 may have a thickness of from about 0.005 to about 0.011 inches and the outer layer 120 may have a thickness of from about 0.030 to about 0.080 inches. As such, the outer diameter D4 is typically from about 0.185 to about 1.29 inches.

As described above, the outer layer 120 comprises the second fluoropolymer. The second fluoropolymer is the same as or different than the first fluoropolymer. The second fluoropolymer is present in an amount greater than 60 parts by weight based on 100 parts by weight of the outer layer 120. In certain embodiments, the second fluoropolymer is present in an amount of from about 65 to about 100, from about 70 to about 90, or about 80, parts by weight based on 100 parts by weight of the outer layer 120.

In certain embodiments, the second fluoropolymer comprises ETFE. In other embodiments, the second fluoropolymer comprises PFA. In other embodiments, the second fluoropolymer comprises polyvinylidene difluoride (PVDF). PVDF is the polymerization product of difluoroethylene.

When the second fluoropolymer comprises ETFE, various grades of ETFE may be used, such as the various grades of ETFE described above. When the second fluoropolymer comprises PFA, various grades of PFA may be used, such as the various grades of PFA described above. When the second fluoropolymer comprises PVDF, various grades of PVDF may be used.

In certain embodiments, the second fluoropolymer of the outer layer 120 and the first fluoropolymer of the layer 110 are the same fluoropolymer. For example, in certain embodiments, the first fluoropolymer and the second fluoropolymer are ETFE. Typically, when the first fluoropolymer and the second fluoropolymer are ETFE the fourth fluoropolymer is TFE/P and the first crosslinker is TAIC.

As described above, in certain embodiments, the outer layer 120 also comprises the third fluoropolymer. When the outer layer 120 comprises the third polymer, the third fluoropolymer is different than the second fluoropolymer. Typically, the third fluoropolymer is TFE/P. In certain embodiments, when the second fluoropolymer does not comprises ETFE, the third fluoropolymer comprises ETFE. In other embodiments, when the second fluoropolymer does not comprises PFA the third fluoropolymer comprises PFA. In other embodiments, when the second fluoropolymer does not comprise PFA, the third fluoropolymer comprises PFA. Although not required, typically the second fluoropolymer is ETFE and the third fluoropolymer is TFE/P.

When the fourth fluoropolymer comprises TFE/P, various grades of TFE/P may be used, such as the various grades described above. When the fourth fluoropolymer comprises ETFE, various grades of ETFE may be used, such as the various grades of ETFE described above. When the fourth fluoropolymer comprises PFA, various grades of PFA may be used, such as the various grades of PFA described above.

When the outer layer 120 comprises the third fluoropolymer, the third fluoropolymer is present in an amount of from about 5 to about 30 parts by weight based on 100 parts by weight of the outer layer 120. Alternatively, the third fluoropolymer is present in an amount of from about 5 to about 25, from about 10 to about 25, or about 20, parts by weight based on 100 parts by weight of the outer layer 120.

In certain embodiments, the outer layer 120 comprises the second fluoropolymer present in an amount of from about 70 to about 95 parts by weight based on 100 parts by weight of the outer layer 120, and the third fluoropolymer present in an amount of from about 5 to about 30 parts by weight based on 100 parts by weight of the outer layer 120. Although not required, in these embodiments, the second fluoropolymer is typically ETFE and the third fluoropolymer typically comprises TFE/P.

In certain embodiments, the outer layer 120 consists essentially of the second fluoropolymer and the third fluoropolymer. "Consists essentially of," as used herein relative to the outer layer 120, allows for the inclusion of other components at a total combined amount of 5 parts by weight or less, based on 100 parts by weight of the outer layer 120, provided that the inclusion of the other components do not materially affect the performance of the outer layer 120 of the layered tube 100 to transport a hydraulic fluid, particularly a hydraulic fluid under high pressure, while maintaining flexibility. In another embodiment, the outer layer 120 consists essentially of ETFE and TFE/P. As a non-limiting example, "consists essentially of" in this context may allow for the inclusion of flow and leveling aids to facilitate the processing of the outer layer 120, or for pigments to color the outer layer 120.

Although not required, the outer layer 120 may also comprise a second crosslinker that is the same as of different than the first crosslinker. Like the layer 110, the outer layer 120 may also comprise the second crosslinker in an unreacted form. Alternatively, the outer layer 120 may comprise the reaction product of the second crosslinker and the second fluoropolymer. Like the layer 110, in embodiments where the outer layer 120 comprises the second crosslinker in the unreacted form, it is to be appreciated that the second crosslinker may still be capable of reacting if exposed to sufficient conditions, such as high heat or other sources of energy. For example, in one embodiment, the outer layer 120 comprises the second fluoropolymer and the second crosslinker in the unreacted form, and after some period of time (e.g. 7 days), the outer layer 120 is exposed to an electron beam. After exposure to the electron beam, the outer layer 120 comprises the reaction product of the second fluoropolymer and the second crosslinker (i.e., the second crosslinker has reacted with the second fluoropolymer such that the outer layer 120 no longer comprises the second crosslinker in the unreacted form).

Typically, the second crosslinker is a triallyl derivative of cyanuric acid. In one embodiment, the triallyl derivative of cyanuric acid is triallyl isocyanurate (TAIC). In another embodiment, the triallyl derivative of cyanuric acid comprises TAIC, triallyl cyanurate (TAC), trimethallyl isocyanurate (TMAIC), or combinations thereof. In certain embodiments, the second crosslinker is the same as the first crosslinker. For example, the first crosslinker and the second crosslinker are typically both TAIC.

In embodiments where the outer layer 120 comprises the second crosslinker, the second crosslinker may be present in an amount of from about 1 to about 10, from about 2 to about 9, from about 3 to about 8, from about 4 to about 7, or from about 5 to about 6, parts by weight based on 100 parts by weight of the outer layer 120. It is to be appreciated that these values are indicative of the amount of second crosslinker actually present in the outer layer 120. If, for example, a portion of the second crosslinker is volatilized during the forming of the outer layer 120, a person of skill in the art would be able to adjust the initial amount of second crosslinker used to obtain the final amount of the second crosslinker actually present. Alternatively, processing conditions could be controlled and/or adjusted to regulate the amount of the second crosslinker that volatizes.

In one embodiment, the outer layer 120 comprises ETFE present in an amount of from about 70 to about 90 parts by weight, TFE/P present in an amount of from about 5 to about 30 parts by weight, and the second crosslinker present in an amount of from about 1 to about 10 parts by weight, each based on 100 parts by weight of the outer layer 120.

The outer layer 120 may also comprise the plurality of additives. The additives may include pigments, leveling/flow aids, fillers, and fibers. The additives may be present in an amount of from about 0.1 to about 20, of from about 1 to about 15, of from about 3 to about 12, or of from about 6 to about 9 parts by weight, based on 100 parts by weight of the outer layer 120. For example, the additives may comprise a potassium octatitanate fiber for improving the strength of the outer layer 120.

In certain embodiments when the outer layer 120 comprises the third fluoropolymer and the second crosslinker, the outer layer 120 comprises the reaction product of the second fluoropolymer, the third fluoropolymer, and the second crosslinker.

In certain embodiments when the outer layer 120 comprises the third fluoropolymer and the second crosslinker, the outer layer 120 consists essentially of the reaction product of the second fluoropolymer, the third fluoropolymer, and the second crosslinker.

In certain embodiments, the outer layer 120 comprises the reaction product of second fluoropolymer present in an amount of from about 70 to about 90 parts by weight, the third fluoropolymer present in an amount of from about 5 to about 20 parts by weight, and the second crosslinker present in an amount of from about 1 to about 10 parts by weight, each based on 100 parts by weight of the outer layer 120.

In certain embodiments, the outer layer 120 comprises the reaction product of ETFE present in an amount of from about 70 to about 90 parts by weight, TFE/P present in an amount of from about 5 to about 20 parts by weight, and TAIC present in an amount of from about 1 to about 10 parts by weight, each based on 100 parts by weight of the outer layer 120. Without being held to any particular theory, in regards to the outer layer 120, ETFE alone is generally considered too stiff to flex, which, depending on the chemical composition of the layer 110, may make the layered tube 100 unsuitable for applications that require a high degree of flexibility. The inclusion of TFE/P softens the outer layer 120, relative to ETFE, to allow for flexibility. However, in certain embodiments and dependent on the chemical composition of the layer 110, ETFE and TFE/P alone (i.e., the use of ETFE and TFE/P without the second crosslinker), although flexible, is too soft and the layered tube 100 will not sufficiently grip the connection elements while the layered tube 100 is transporting a hydraulic fluid under high pressure. In other words, in these certain embodiments, the use of EFTE and TFE/P alone is not suitable for transporting a hydraulic fluid under high pressure, because the high pressure may loosen the connection elements from the layered tube 100. To this end, the reaction product described in this embodiment achieves a surprising and unexpected balance of properties that provides for a balance of flexibility and stiffness in the layered tube 100, and allows the layered tube 100 to grip the connection elements while the layered tube 100 is transporting a hydraulic fluid under high pressure.

The reaction product may be produced by subjecting the outer layer 120 containing the unreacted crosslinker, to radiation or other sources of energy sufficient to produce a free radical. It is to be appreciated that when the reaction product of the second crosslinker and the fourth fluoropolymer is expressed as a series of weight percents pertaining to individual components, the weight percent of each individual component is the weight percent of the individual component prior to the formation of the reaction product, even though the individual components may have been chemically altered in the reaction to form the reaction product.

The reaction product may be produced by any mechanism capable of creating a free radical, such as applying radiation to the outer layer 120. For example, when the outer layer 120 comprises the second crosslinker, the reaction product of the second crosslinker, the second fluoropolymer and optionally, the fourth fluoropolymer may be formed by subjecting the outer layer 120 to an electron beam. It is to be appreciated that subjecting the outer layer 120 to the electron beam typically also subjects the layer 110 to the electron beam. In other words, both the layer 110 and the outer layer 120 can be cured simultaneously by subjecting the layered tube 100 to the electron beam. Without being held to any particular theory, an electron beam is beneficial for forming the reaction product because the electron beam creates free radicals and also creates unsaturation.

In certain embodiments, when the layer 110 and/or the layered tube 100 are subjected to the radiation (i.e., the crosslinking process) in order to limit polymer chain mobility such that gross flow, as evidenced by creep or stress relaxation, and crazing are inhibited. Although not required, generally when the layer 110 and/or the layered tube 100 is exposed to the radiation, the layer 110 and/or layered tube 100 are lightly crosslinked (i.e., the layer 110 or layered tube 100 have a low crosslink density). One of skill in the art would appreciate that light crosslinking includes a process that produces a reaction product that allows for greater molecular motion and ductility which is greater than what is typical of a material having a tight 3-D crosslinked network (i.e., high crosslink density). The light crosslinking can be effectuated by selecting the exposure time to the electron beam or decreasing the amount of the first and/or second crosslinker. In certain embodiments of the layer 110, particularly when a high degree of flexibility is required, the layer 110 is lightly crosslinked. In certain embodiments of the layered tube 100, both the layer 110 and the outer layer 120 are lightly crosslinked.

In one embodiment, the degree of crosslinking may be analyzed by quantifying the amount of swelling that occurs when the material is subjected to solvent. As the degree of crosslinking increases, the swell will go down because the materials are more tightly bound to one another. An acceptable amount of swell for the fluoropolymer blend when submerged in hydraulic fluid, such as SKYDROL®, is about 5% to about 30% by volume. In another example, an acceptable amount of swell would be about 7% to about 15% by volume.

Although not required, in certain embodiments of the layered tube 100, the layer 110 is in direct contact with the outer layer 120, and the layer 110 and the outer layer 120 are melt bonded together. Typically, when the outer layer 120 and the inner layer 110 are in direct contact, the outer and inner layer 120, 110 are co-extruded. Having the layer 110 and outer layer 120 in direct contact with each other and melt bonded with each other is particularly beneficial when the layered tube 100 is exposed to high pressure. When the layer 110 and outer layer 120 are melt bonded, the layer 110 is prevented from "rotating" inside of the outer layer 120, which is another defect associated with conventional hoses that transport hydraulic fluids.

In another embodiment, the layered tube 100 consists essentially of the layer 110 and the outer layer 120. In other words, the layered tube 100 includes only the layer 110 and the outer layer 120.

In one embodiment, the layered tube 100 consists essentially of (A) the layer 110, and (B) the outer layer 120 surrounding the layer 110. In this embodiment, the layer 110 comprises the first fluoropolymer present in an amount greater than 60 parts by weight, the first crosslinker present in an amount of from about 1 to 10 parts by weight, and the anti-static additive present in an amount of from about 0.4 to about 3 parts by weight, each based on 100 parts by weight of the layer 110. Also in this embodiment, the outer layer 120 comprises the second fluoropolymer present in an amount greater than 60 parts by weight based on 100 parts by weight of the outer layer 120. Although not required, in this embodiment, the anti-static additive typically comprises carbon nanotubes.

In one embodiment, the layered tube 100 consists essentially of (A) the layer 110, and (B) the outer layer 120 surrounding the layer 110. In this embodiment, the layer 110 comprises ETFE present in an amount greater than 60 parts by weight, TAIC present in an amount of from about 1 to about 20 parts by weight, and carbon nanotubes present in an amount of from about 0.4 to about 3 parts by weight, each based on 100 parts by weight of the layer 110. Also in this embodiment, the outer layer 120 comprises the ETFE present in an amount greater than 60 parts by weight based on 100 parts by weight of the outer layer 120.

In one embodiment, the layered tube 100 consists essentially of (A) the layer 110, and (B) the outer layer 120 surrounding the layer 110. In this embodiment, the layer 110 comprises carbon nanotubes and a reaction product formed from ETFE present in an amount of from about 70 to about 90 parts by weight, TFE/P present in an amount of from about 5 to about 25 parts by weight, and the first crosslinker present in an amount of from about 1 to about 10 parts by weight, each based on 100 parts by weight of the layer 110. Also in this embodiment, the outer layer 120 comprises a reaction product formed from ETFE present in an amount of from about 60 to about 90 parts by weight, TFE/P present in an amount of from about 5 to about 30 parts by weight, and the second crosslinker present in an amount of from about 1 to about 10 parts by weight, each based on 100 parts by weight of the outer layer 120.

Figure 3:
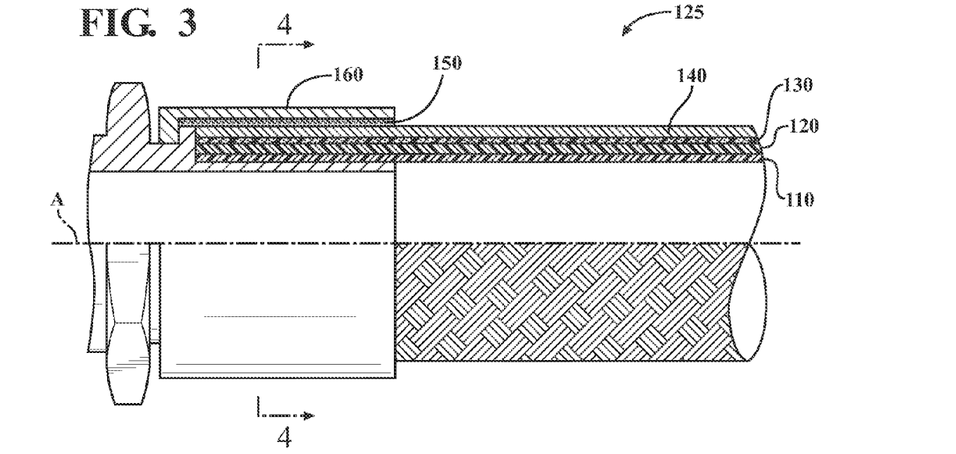
FIG. 3 is a partial cross sectional plan view of an embodiment of a hose assembly.
Figure 4:
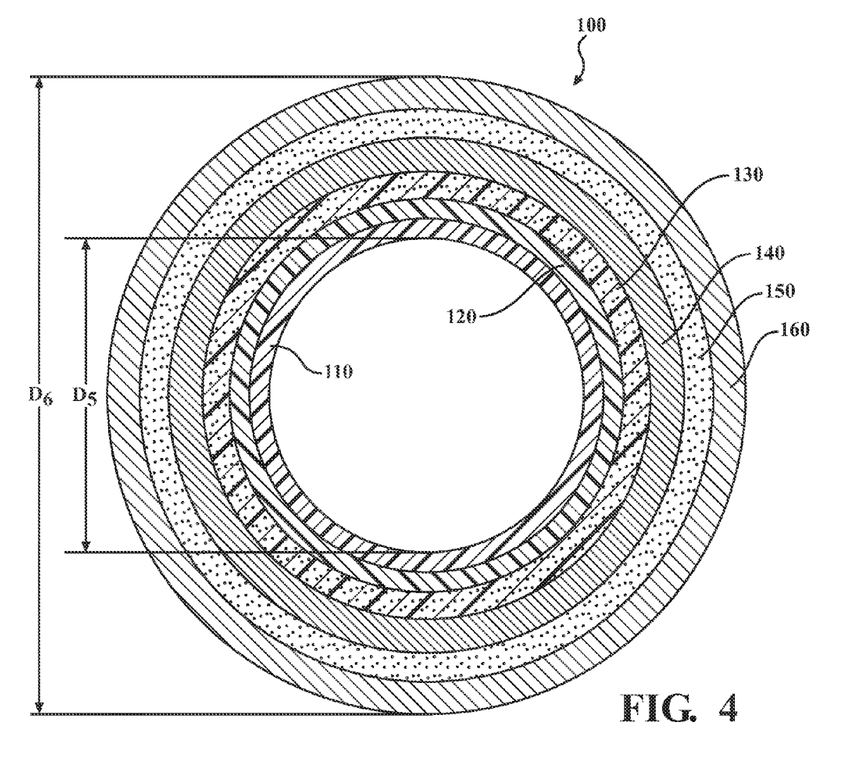
FIG. 4 is a cross sectional view of an embodiment of the hose assembly.
Figure 5:
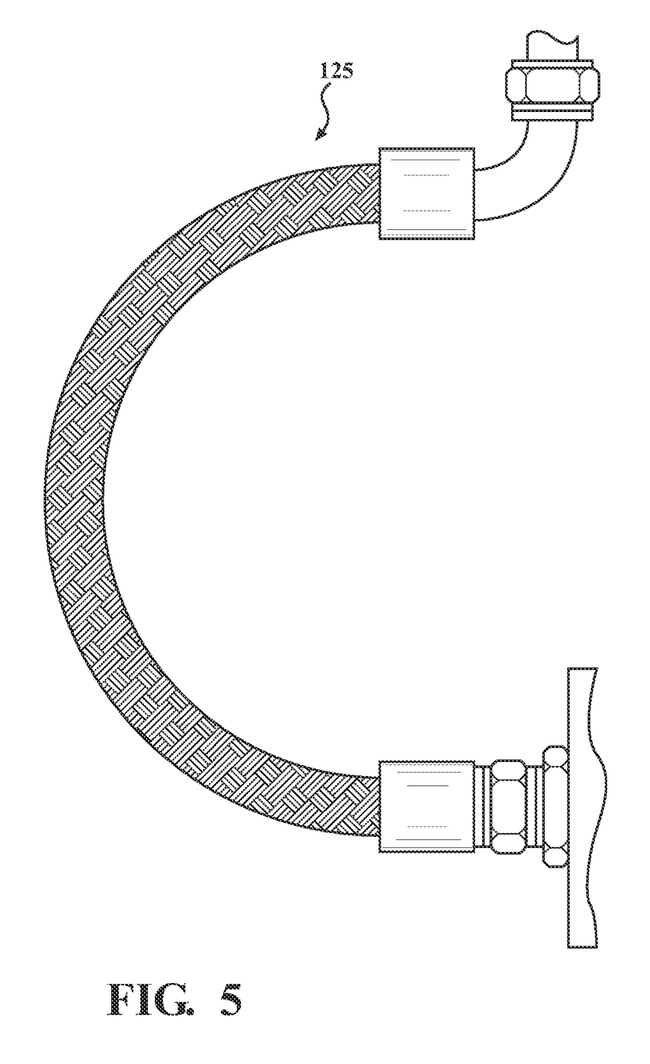
FIG. 5 is a view of an embodiment of the hose assembly bent at a minimum inside bend radius.

As best shown in FIGS. 3 to 5, the present disclosure also provides a hose assembly 125. The hose assembly 125 includes the layered tube 100. Specifically, the hose assembly 125 is a multi-layer structure that includes the layer 110, the outer layer 120, and a reinforcement layer 130. The hose assembly 125 may be referred to simply as a hose, or a high performance hose because of the performance of the hose assembly 125. For ease of reference, the hose assembly 125 is only referred to as the hose assembly 125 hereinafter.

The hose assembly 125 comprises the layered tube 100 and a reinforcement layer 130. The reinforcement layer 130 is constructed of para-aramid synthetic fibers.

As shown in FIG. 3, the hose assembly 125 extends axially to a predetermined length along a central longitudinal axis A. As shown in FIG. 4, the hose assembly 125 has inner diameter D5 and outer diameter D6. The dimensions of the inner diameter D5 and the outer diameter D6 can vary depending upon the particular fluid conveying application involved. In one embodiment, the hose assembly 125 conveys hydraulic fluid, such as SKYDROL®.

The layer 110 includes an inner surface, which defines the inner diameter D5, and an outer surface, which defines a wall thickness there between. As with the overall dimensions of the hose assembly 125, the wall thickness of the layer 110 may vary depending upon the particular fluid conveying application of the hose assembly 125.

In an alternative embodiment (not shown), an intermediate layer may be provided between the layer 110 and the outer layer 120, particularly if the first fluoropolymer and the second fluoropolymer are different.

The reinforcement layer 130 may be arranged in a braided orientation around the outer layer 120. Alternatively, the reinforcement layer 130 can include a spirally wound, knitted, or wrapped reinforcement material around the outer layer 120. The reinforcement layer 130 is employed in the hose assembly 125 to resist collapsing of the outer layer 120. In other words, although not required, the reinforcement layer 130 supports the structure of the layered tube 100, particularly when the hose assembly 125 is exposed to high pressure. Notably, the reinforcement layer 130 is not required to completely cover or encapsulate the outer layer 120. For example, when the reinforcement layer 130 is arranged in a braided orientation, gaps in the "braiding" may expose the outer layer 120. Moreover, the reinforcement layer 130 may not extended the complete length of outer layer 120 or the hose assembly 125. For example, the reinforcement layer 130 may be present in a location that the hose assembly 125 is bent and absent in locations where the hose assembly 125 is linear (i.e., "not bent"). Of course, the first reinforcement layer 130 may fully cover (i.e., surround/encapsulate) the outer layer 120 (e.g., 100% coverage as shown in FIG. 3) or partially cover the outer layer 110 (e.g., 50% coverage).

The first reinforcement layer 130 is constructed of para-aramid synthetic fibers, such as KEVLAR. In certain embodiments, para-aramid synthetic fibers strengthen the hose assembly 125 and prevents the layer 110 and outer layer 120 from cracking. In one embodiment, the reinforcement layer 130 is a 2×2 braid of three ends of para-aramid synthetic fibers.

Although not required, a second reinforcement layer 140 may also be included in the hose assembly 125. Like the reinforcement layer 130, the second reinforcement layer 140 may include a braided reinforcement material. Alternatively, the second reinforcement layer 140 can include a spirally wound, knitted, or wrapped reinforcement material. When the second reinforcement layer 140 is included, the second reinforcement layer 140 further reinforces the outer layer 120. Like the reinforcement layer 130, the second reinforcement layer 140 is not required to fully cover the reinforcement layer 130 or the outer layer 120. The second reinforcement layer 140 is also typically constructed of para-aramid synthetic fibers, such as KEVLAR.

In another embodiment, the hose assembly 125 further includes an adhesive layer 150. The adhesive layer 150 is typically double sided adhesive tape constructed of a PTFE, such as TEFLON. In alternative embodiments, the adhesive layer 150 is a double sided polyester/mylar adhesive tape.

The hose assembly 125 may further comprise an outer cover 160. The outer cover 160 typically includes a braided material such as polyester fiber. Alternatively, the outer cover 160 can be metal. The outer cover 160 assists in keeping the cross-section of the outer layer 120 round as well as providing an aesthetically pleasing appearance. In addition, the polyester fiber protects the inner components from wear and abrasion. In other embodiments, the outer cover can include natural or synthetic fibers. Moreover, the outer cover 160 may include a single ply or multiple plies of materials.

In certain embodiments, the layered tube 100 meets specific performance requirements, depending on the application. In one known application, the layered tube 100 conveys fluid at a pressure of 5,080 psi (35 MPa). For safety considerations, it is desirable for the layered tube 100 to have a minimum burst pressure of 20,320 psi (140 MPa) at room temperature and a minimum burst pressure of 15,240 psi (105 MPa) at 275° F. (135° C.). It is also desirable for the layered tube 100 to pass additional safety tests, including a pressure impulse test, a push/pull test, an assembly flex test, and a thermal variation test.

In a pressure impulse test, the layered tube 100 goes through the following cycle: fluid pressure is increased from 0 to 7,620 psi (52.5 MPa), then decreased and held at 5,080 psi (35 MPa), and then decreased to 0 psi. This cycle is repeated at a rate of 70 cycles per minute. It is desirable for the layered tube 100 to pass through 300,000 cycles without failing.

In a push/pull test, the layered tube 100 is maintained in a linear orientation. A first end of the layered tube 100 is fixed, and the second end is alternately moved towards the first end, and away from the first end. This cycle is repeated at a rate of 20-60 cycles per minute. It is desirable for the layered tube 100 to pass through 50,000 cycles without failing.

In an assembly flex test, for the layered tube 100 is bent to its minimum inside bend radius R, as shown in FIG. 5 (illustrated with the hose assembly 125). A first end of the layered tube 100 is fixed, while a second end is alternately moved in a straight line parallel to the axis of the opening of the second end. For example, in FIG. 5, the top end of the layered tube 100 is fixed, and the bottom end is moved from left to right. This cycle is repeated at a rate of 60-80 cycles per minute. It is desirable for the layered tube 100 to pass through 400,000 cycles without failing.

A thermal variation test may be used to detect microscopic voids or crazing in the layered tube 100. In a thermal variation test, the hose is pressurized to 5080 psi, then brought to a temperature of 275° F. The layered tube 100 is held at that temperature for four hours. Then the layered tube 100 is cooled to −65° F. over the course of an hour. The layered tube 100 is held at −65° F. for four hours. Then the layered tube 100 is heated back up to 275° F. over the course of an hour. This completes 1 cycles. This cycle is repeated continuously until the layered tube 100 shows microscopic voids. The layered tube 100 is continuously pressurized during the temperature cycling. The layered tube 100 passes the test if it goes through 20 cycles without microscopic voids.

The present disclosure also provides a method. The method may be used to form the layer 110. Certain embodiments of the method may also be used to form the layered tube 100. Certain embodiments of the method may also be used to form the hose assembly 125.

The method comprises premixing the anti-static additive and the first crosslinker to form an anti-static intermediate mixture where the anti-static additive is dispersed in the first crosslinker. Premixing the anti-static additive to disperse the anti-static additive is advantageous because, when the anti-static additive is dispersed the anti-static additive establishes a higher electrical conductivity in the layer 110 as compared to a layer containing the anti-static additive in an agglomerated form. As such, dispersing the anti-static additive lowers the amount of the anti-static additive required to achieve the desired level of electrical conductivity (i.e., the level of electrical conductivity required to dissipate a static electric charge). Moreover, the lower amount of antistatic additive included, the more efficiently the anti-static additive can be dispersed. As such, dispersing the anti-static additive has a synergistic effect because even less anti-static additive is required to achieve the desired electrical conductivity. Moreover, because premixing the antistatic additive permits the desired level of electrical conductivity to be established with a lower amount of the anti-static additive, a higher amount of the first fluoropolymer and other components, if present, are present in the layer 110. As such, because the electrical conductivity or electrical resistivity of the layer 110 is established with a relatively lower amount of the anti-static additive, the mechanical properties of the layer 110, such as the tensile strength are increased, due to the relatively larger amount of the first fluoropolymer and other components, if present, included in the layer 110.

In certain embodiments, the anti-static additive comprises the carbon nanotubes. Carbon nanotubes have a large surface area to volume ratio. As a result of this large surface area to volume ratio, carbon nanotubes have a large surface energy and thus a tendency to agglomerate. As such, dispersing the carbon nanotubes in the first crosslinker reduces this potential agglomeration and reduces the concentration of carbon nanotubes required to achieve the desired electrical conductivity in the layer 110.

In certain embodiments, the method further comprises applying heat to the anti-static additive to remove moisture from the anti-static additive prior to premixing the anti-static additive and the first crosslinker. Although not required, removing moisture from the anti-static additive, particularly when the anti-static additive comprises the carbon nanotubes, is preferred for purposes of maximizing the impact that the carbon nanotubes will have on the electrical conductivity. Removing the moisture also facilitates the dispersion of the anti-static additive into the first crosslinker. As such, removing the moisture also contributes to reducing the amount of anti-static additive that is required to achieve the desired electrical conductivity in the layer 110.

The method also comprises compounding the anti-static intermediate mixture and at least a portion of the first fluoropolymer to form a first compound mixture. In other words, the anti-static intermediate mixture can be compounded with some portion of the first fluoropolymer, of can be compounded with the entire portion of the first fluoropolymer. When only a portion of the first fluoropolymer is used and compounded with the anti-static mixture, various other opportunities, or pathways, are available to include the remainder of the total amount of the first fluoropolymer present in the layer 110. Some of the other pathways for including the remainder of the first fluoropolymer are described below.

Typically, the anti-static intermediate mixture and the at least a portion of the first fluoropolymer are compounded with a twin screw extruder. The twin screw extruder is typically capable of achieving process temperatures up to 350° C. Although not required, the compounded first mixture may be in the form of pellets. Generally, the pellets are 0.05 to about 0.2 inches in length.

The method also comprises extruding the first compounded mixture to form the layer 110. The extruder is typically the twin screw extruder described above. In certain embodiments, a void volume is maintained in the extruder. For example, the first compounded mixture may fill from about 30 to about 60 percent of the total volume of the extruder. Alternatively, the first compounded mixture may fill from about 40 to 55 percent of the total volume of the extruder. Maintaining the void volume in the extruder increases the shear that is applied to first compounded mixture because the shear force that is generated from the extruder is transferred to a relatively lower volume of the first compounded mixture as compared to a volume of the first compounded mixture where no void volume is maintained (i.e., a volume in which the extruder is full). Increasing the shear further disperses the anti-static additive, particularly when the anti-static additive comprises the carbon nanotubes.

Although the first fluoropolymer is a solid, the physical form of the first fluoropolymer may be manipulated. Certain physical forms of the first fluoropolymer may advantageously be used in various steps of the method. In general, the first fluoropolymer is in the form of a pellet having a length of 0.05 to about 0.2 inches. In certain embodiments, it may be advantageous to decrease the particle size of the first fluoropolymer, such that the first fluoropolymer is in the form of a powder, which has a particle size less than a pellet as is known in the art. The particle size of a fluoropolymer may be decreased by any suitable method including, but not limited to, blending, milling, crushing, grinding, etc. As such, the particle size of the first fluoropolymer may be decreased by the methods set forth above.

In certain embodiments, the method further comprises mixing the anti-static intermediate mixture and a second portion of the first fluoropolymer prior to compounding the anti-static intermediate mixture and the first fluoropolymer. Mixing the antistatic intermediate mixture with the second portion of the first fluoropolymer may further disperse the anti-static additive, particularly when the anti-static additive comprises carbon nanotubes, and, when the second portion of the first fluoropolymer is in the form of a powder.

In certain embodiments, the method further comprises compounding the anti-static intermediate mixture and the first fluoropolymer comprises compounding the anti-static intermediate mixture, the first fluoropolymer, and the fourth fluoropolymer to form the first compounded mixture, provided that the fourth fluoropolymer is different than the first fluoropolymer as noted above.

In certain embodiments, the first compounded mixture consists essentially of the first fluoropolymer, the first crosslinker, and the anti-static additive. In certain embodiments, the first compounded mixture consists essentially of ETFE, TAIC, and carbon nanotubes. Moreover, in certain embodiments, the fourth fluoropolymer comprises TFE/P.

Similar to the first fluoropolymer, the fourth fluoropolymer may be present in any physical form. Typically, the fourth fluoropolymer is a pellet. In certain embodiments, it may be advantageous to decrease the particle size of the fourth fluoropolymer, such that the fourth fluoropolymer is in the form of a powder.

In certain embodiments, the first compounded mixture consists essentially of the first fluoropolymer, the first crosslinker, and the anti-static additive. In other embodiments, the first compounded mixture comprises the fourth fluoropolymer, in these embodiments, the anti-static intermediate mixture, the first fluoropolymer, and the fourth fluoropolymer are compounded to form the first compounded mixture.

In certain embodiments of the method, varying shear rates are applied in the compounding step to further disperse the anti-static additive and to avoid subjecting particular fluoropolymers to certain processing conditions, such as too high or too low of shear as described below. Shear is a term used to convey the relative amount of stress that applied to any given material. As such, if a material is sheared under high-shear as compared to low shear, a greater stress is applied to the material. However, whether shear is high or low depends on multiple factors that include the geometry of the object providing the shear. For example, two different geometries rotating at the same speed will apply different amounts of shear. However, generally speaking, if the same geometry is to rotate at differing speeds, the higher speed will apply a higher stress to the material.

In certain embodiments, compounding the anti-static intermediate mixture and at least the portion of the first fluoropolymer is further defined as compounding under high-shear. In one embodiment, compounding under high-shear comprises compounding in an extruder with a high-shear extrusion screw having an L:D ratio of about 30:1 at a revolution per minute of at least 100, more specifically 150 to 350. Alternatively, compounding under high-shear comprises compounding in an extruder with the same high-shear extrusion screw at a revolution per minute of from 200 to 350. A high-shear extrusion screw is an extrusion screw that includes a large number of kneading blocks. Comparatively speaking, a low-shear extrusion screw is an extrusion screw having fewer kneading blocks than the high-shear extrusion screw. Moreover, not only does the high-shear extrusion screw have more kneading blocks than the low shear extrusion screw, the individual kneading blocks on the high-shear extrusion screw are larger than the individual kneading blocks on the low-shear extrusion screw.

In certain embodiments, compounding the anti-static intermediate mixture and at least the portion of the first fluoropolymer is further defined as a high-shear compounding step using the high-shear extrusion screw and a low-shear compounding step using a low-shear extrusion screw. In these embodiments, in the high-shear compounding step, the anti-static intermediate mixture and at least the portion of the first fluoropolymer are compounded under high-shear with the high-shear extrusion screw at a revolution per minute of 100 to 400 to form the first compounded mixture. In these embodiments, in the low-shear compounding step, the first compounded mixture and the fourth fluoropolymer are compounded under low-shear with the low-shear extrusion screw at a revolution per minute of 100 to 300. Although there are overlaps in the associated revolutions per minute, different extruding screws are implemented, one for the high-shear compounding step, and another for the low-shear compounding step. In certain embodiments, the high-shear extrusion screw rotates at a revolution per minute of from 150 to 400, alternatively from 150 to 350, alternatively from 200 to 350, or alternatively from 250 to 350. In certain embodiments, the low shear-extrusion screw rotates at a revolution per minute of 100 to 250, or alternatively from 100 to 200.

In certain embodiments, the method may further comprise compounding the first compounded mixture and a second portion of the first fluoropolymer to form a third compounded mixture. Although not required, the second portion of the first fluoropolymer is typically powder in form. In these embodiments, the method may comprise compounding the first compounded mixture, the second portion of the first fluoropolymer, and the fourth fluoropolymer to form the third compounded mixture. When the fourth fluoropolymer is compounded in these embodiments, the fourth fluoropolymer is typically powder in form.

In certain embodiments, compounding the anti-static intermediate mixture and at least the portion of the first fluoropolymer is further defined as a high-shear compounding step and a low-shear compounding step. In these embodiments, each compounding step uses the same extrusion screw. In the high-shear compounding step, the antistatic intermediate mixture and at least the portion of the first fluoropolymer are compounded under high-shear with the extrusion screw at a revolution per minute of greater than 200 to 400 to form the first compounded mixture. Alternatively, in the high-shear compounding step, at least the portion of the first fluoropolymer are compounded under high-shear with the extrusion screw at a revolution per minute of from 250 to 400, alternatively from 250 to 350, or alternatively from 300 to 400. In the low-shear compounding step, the first compounded mixture and the fourth fluoropolymer are compounded under low-shear with the extrusion screw at a revolution per minute of 200 or less. Alternatively, in the low-shear compounding step, the revolutions per minute may be from 80 to 180, from 100 to 180, or from 100 to 150. In these embodiments, the method may further comprise compounding the first compounded mixture and a second portion of the first fluoropolymer to form a third compounded mixture. Although not required, the second portion of the first fluoropolymer is typically powder in form. In these embodiments, the method may comprise compounding the first compounded mixture, the second portion of the first fluoropolymer, and the fourth fluoropolymer to form the third compounded mixture. When the fourth fluoropolymer is compounded in these embodiments, the fourth fluoropolymer is typically powder in form.

In the embodiments described above that compound under high-shear, the high-shear further disperses the anti-static additive, particularly the carbon nanotubes. As such, the high-shear further decreases the relative amount of the anti-static additive, particularly the carbon nanotubes, required to achieve the desired level of electrical conductivity. As a result, compounding under high-shear also serves to improve the mechanical properties of the layer 110, such as the tensile strength of the layer 110, by enabling the inclusion of more of other components, such as the first fluoropolymer and the like.

It is to be appreciated that in embodiments where the third compounded mixture is formed, the third compounded mixture is extruded to form the layer 110.

In certain embodiments, the method further comprises applying radiation to the layer 110 to cure the layer 110. For example, the radiation may be applied to the layer 110 via an electron beam. Curing the layer 110 may further increases the electrical conductivity of the layer 110.

In certain embodiments, the method further comprises compounding the second fluoropolymer and the second crosslinker to form the second compounded mixture, and further comprises extruding the second compounded mixture to form the outer layer 120 surrounding the layer 110 thereby forming the layered tube 100. In these embodiments, the second fluoropolymer is the same as or different than the first fluoropolymer and the second crosslinker is the same as or different than the first crosslinker. Although not required, the third fluoropolymer may be compounded with the second crosslinker and the second fluoropolymer to form the second compounded mixture, wherein the third fluoropolymer is different than the second fluoropolymer as noted above. As such, when the third fluoropolymer is compounded with the second fluoropolymer and the second crosslinker, once extruded, the outer layer 120 comprises the second fluoropolymer, the third fluoropolymer, and the second crosslinker.

Although not required, the first compounded mixture and the second compounded mixture may be co-extruded to form the layered tube 100. When the first compounded mixture and the second compounded mixture are co-extruded, the layer 110 and the outer layer 120 are typically melt bonded together. It is to be appreciated that when the third compounded mixture is formed, the third compounded mixture and the second compounded mixture may be co-extruded to form the layered tube 100 as described above.

In certain embodiments, once the layered tube 100 is formed, the method further comprises applying radiation to the layered tube 100 to cure the layered tube 100. Typically, the radiation is applied via an electron beam. Subjecting the layered tube 100 to radiation cures the layer 110 despite that the fact that the outer layer 120 surrounds the layer 110.

In certain embodiments, the second fluoropolymer is ETFE. In certain embodiments, the third fluoropolymer is TFE/P. Typically, the second fluoropolymer is ETFE and the third fluoropolymer is TFE/P. In certain embodiments, the first and the second fluoropolymers are ETFE, the third and the fourth fluoropolymers are TFEP, and the first and second crosslinkers comprise triallyl derivatives of cyanuric acid.

In certain embodiments, the method further comprises the step of applying radiation to the outer layer 120 to cure the layered tube 100. Although not required, the radiation may be applied via an electron beam.

In certain embodiments, the method further comprises forming a hose assembly comprising the layered tube 100 and the reinforcement layer 130 constructed of para-aramid synthetic fibers. The method may also comprise providing the outer cover 160. The method may also provide an adhesive layer 150 between the reinforcement layer 130 and the outer cover 160.

The following examples are intended to illustrate the invention and are not to be viewed in any way as limiting to the scope of the invention.

EXAMPLES

Layers and layered tubes containing the layer were constructed using the following method. A portion of the carbon nanotubes anti-static additive was weighed and dried for twelve hours at 100° C. in a vacuum oven. A portion of first crosslinker (TAIC) that has been pre-mixed with a heat stabilizer was then heated to 50° C. to form a warm liquid. The liquid TAIC was then combined with the dried carbon nanotubes anti-static additive in a high speed blender to form the anti-static intermediate mixture.

The first fluoropolymer (ETFE) in the form of a pellet were weighed and a portion of the first fluoropolymer ground in to a powder. The remaining portion of the first fluoropolymer was retained as pellets. The first fluoropolymer in the form of the powder was then mixed with an equal portion of a fourth fluoropolymer (TFE/P) in a blender.

The anti-static intermediate mixture was then mixed with the remaining pellets of the first fluoropolymer, and using a gravimetric feeder, fed into a compounding machine that has a high shear screw and heated to between about 540° F. and 590° F. The high shear screw was rotated about 100 rpm to about 450 rpm, and the feed rate is about 7.5 to about 15 lbs/hour to form the first compounded mixture. The diameter of the high shear screws was 27 mm. The first compounded mixture was in the physical form of pellets.

The resulting pellets of the first compounded mixture were then mixed with the powder containing the first and fourth fluoropolymers and fed into a compounding machine with a low shear screw, with a screw speed of about 100 rpm to 300 rpm, a feed rate of about 7.5 to 15 lbs/hour to form the third compounded mixture.

Sample outer layers were constructed using the following method. The second fluoropolymer (ETFE) in the form of pellets were weighed and a portion ground in to a powder. The remaining portion of the second fluoropolymer is retained as pellets. The second fluoropolymer in the form of the powder is mixed with an equal portion of third fluoropolymer (TFE/P) in a blender and then mixed with the second crosslinker (TAIC), after the second crosslinker was pre-mixed with a heat stabilizer. Using a gravimetric feeder with a feed rate of about 10 to about 15 lbs/hour, the second fluoropolymer, the third fluoropolymer and the second cross linker were fed into a compounding machine with a low shear screw speed of about 200 rpm and heated to about 540° F. to about 590° F. to the second compounded mixture.

A layered tube was then extruded by co-extruding the third compounded mixture and the second compounded mixture. The layered tubes were then subjected to an electron beam to cure the layered tubes.

Six sample layered tubes were prepared as follows in Table I. All of the values provided in Table I are based on 100% by weight of the respective layer.

TABLE I

| Sample | Outer Layer | Layer |
|---|---|---|
| 1 | 86% ETFE<br>10% TFE/P<br>4% TAIC | 85% ETFE<br>10% TFE/P<br>4% TAIC<br>1% Carbon Nanotubes |
| 2 | 86% ETFE<br>10% TFE/P<br>4% TAIC | 84.8% ETFE<br>10% TFE/P<br>4% TAIC<br>1.2% Carbon Nanotubes |
| 3 | 86% ETFE<br>10% TFE/P<br>4% TAIC | 75% ETFE<br>20% TFE/P<br>4% TAIC<br>1% Carbon Nanotubes |
| 4 | 86% ETFE<br>10% TFE/P<br>4% TAIC | 74.8% ETFE<br>20% TFE/P<br>4% TAIC<br>1.2% Carbon Nanotubes |
| 5 | 86% ETFE<br>(C55AX)<br>10% TFE/P<br>4% TAIC | 85% ETFE<br>10% TFE/P<br>4% TAIC<br>1% Carbon Nanotubes |
| 6 | 76% ETFE<br>20% TFE/P<br>4% TAIC | 85% ETFE<br>10% TFE/P<br>4% TAIC<br>1% Carbon Nanotubes |

In addition to the layered tubes prepared above, samples of the second and third compounded mixtures were prepared, but not extruded. Their compositions are as follows in Table II. All of the values provided in Table I are based on 100% by weight of the respective layer.

TABLE II

| Sample | Outer Layer | Layer |
|---|---|---|
| 7 | 86% ETFE<br>10% TFE/P<br>4% TAIC | 84.5% ETFE<br>10% TFE/P<br>4% TAIC<br>1.5% Carbon Nanotubes |
| 8 | 86% ETFE<br>(C55AX)<br>10% TFE/P<br>4% TAIC | 84% ETFE<br>10% TFE/P<br>4% TAIC<br>2% Carbon Nanotubes |
| 9 | 86% ETFE<br>10% TFE/P<br>4% TAIC | 83.5% ETFE<br>10% TFE/P<br>4% TAIC<br>2.5% Carbon Nanotubes |
| 10 | 86% ETFE<br>(C55AX)<br>10% TFE/P<br>4% TAIC | 83% ETFE<br>10% TFE/P<br>4% TAIC<br>3% Carbon Nanotubes |
| 11 | 86% ETFE<br>10% TFE/P<br>4% TAIC | 82.5% ETFE<br>10% TFE/P<br>4% TAIC<br>3.5% Carbon Nanotubes |
| 12 | 86% ETFE<br>10% TFE/P<br>4% TAIC | 84.5% ETFE<br>10% TFE/P<br>4% TAIC<br>1.5% Carbon Nanotubes |
| 13 | 86% ETFE<br>10% TFE/P<br>4% TAIC | 84% ETFE<br>10% TFE/P<br>4% TAIC<br>2% Carbon Nanotubes |
| 14 | 86% ETFE<br>(C55AX)<br>10% TFE/P<br>4% TAIC | 83.5% ETFE<br>10% TFE/P<br>4% TAIC<br>2.5% Carbon Nanotubes |
| 15 | 86% ETFE<br>(C55AX)<br>10% TFE/P<br>4% TAIC | 83% ETFE<br>10% TFE/P<br>4% TAIC<br>3% Carbon Nanotubes |
| 16 | 86% ETFE<br>10% TFE/P<br>4% TAIC | 82.5% ETFE<br>10% TFE/P<br>4% TAIC<br>3.5% Carbon Nanotubes |

Of the samples prepared, the electrical resistivity of the layer of Samples 1 and 7-11 were measured using techniques known to those of skill in the art. In general, the electrical resistivity of layered tubes, such as those for use in aircraft technology, should be about 10KΩ to about 100MΩ. Specifically, the layer of Sample 1 had an electrical resistivity of 500KΩ, while the layers of Samples 7-11 had an electrical resistivity of 900, 500, 200, 50, and 2, KΩ, respectively. The results indicate materials and layers of Samples 1, 7-11 have excellent electrical resistivity.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described. The subject matter of all combinations of independent and dependent claims, both singly and multiply dependent, is herein expressly contemplated.

The invention claimed is:

1. A method comprising:
   premixing an anti-static additive and a first crosslinker to form an anti-static intermediate mixture where the anti-static additive is dispersed in the first crosslinker;
   compounding the anti-static intermediate mixture and at least a portion of a first fluoropolymer to form a first compounded mixture; and
   extruding the first compounded mixture to form a layer.

2. The method as set forth in claim 1 wherein the anti-static additive comprises carbon nanotubes.

3. The method as set forth in claim 1 further comprising mixing the anti-static intermediate mixture and a second portion of the first fluoropolymer prior to compounding the anti-static intermediate mixture and the first fluoropolymer, wherein the second portion of the first fluoropolymer is powder in form.

4. The method as set forth in claim 1 wherein the first compounded mixture consists essentially of the first fluoropolymer, the first crosslinker, and the anti-static additive.

5. The method as set forth in claim 1 wherein compounding the anti-static intermediate mixture and at least the portion of the first fluoropolymer is further defined as compounding under high-shear.

6. The method as set forth in claim 5 wherein compounding under high-shear comprises compounding in an extruder with a high-shear extrusion screw having an L:D ratio of about 30:1 at a revolution per minute of at least 100.

7. The method as set forth in claim 1 further comprising;
   compounding a second fluoropolymer and a second crosslinker to form a second compounded mixture; and
   extruding the second compounded mixture to form an outer layer surrounding the layer thereby forming a layered tube including the layer and the outer layer;
   wherein the second fluoropolymer is the same as or different than the first fluoropolymer; and
   wherein the second crosslinker is the same as or different than the first crosslinker.

8. The method as set forth in claim 7 wherein a third fluoropolymer is compounded with the second crosslinker and the second fluoropolymer to form the second compounded mixture, and wherein the third fluoropolymer is different than the second fluoropolymer.

9. The method as set forth in claim 1 wherein compounding the anti-static intermediate mixture and the first fluoropolymer comprises compounding the anti-static intermediate mixture, the first fluoropolymer, and a fourth fluoropolymer to form the first compounded mixture, and wherein the fourth fluoropolymer is different than the first fluoropolymer.

10. The method as set forth in claim 9 wherein compounding the anti-static intermediate mixture and at least the portion of the first fluoropolymer is further defined as a high-shear compounding step using a high-shear extrusion screw and a low-shear compounding step using a low-shear extrusion screw where, in the high-shear compounding step, the anti-static intermediate mixture and at least the portion of the first fluoropolymer are compounded under high-shear with the high-shear extrusion screw at a revolution per minute of 100 to 400 to form the first compounded mixture and, in the low-shear compounding step, the first compounded mixture and the fourth fluoropolymer are compounded under low-shear with the low-shear extrusion screw at a revolution per minute of 100 to 300.

11. The method as set forth in claim 9 wherein compounding the anti-static intermediate mixture and at least the portion of the first fluoropolymer is further defined as a high-shear compounding step and a low-shear compounding step with each compounding step using the same extrusion screw where, in the high-shear compounding step, the anti-static intermediate mixture and at least the portion of the first fluoropolymer are compounded under high-shear with the extrusion screw at a revolution per minute of greater than 200 to 400 to form the first compounded mixture and, in the low-shear compounding step, the first compounded mixture and the fourth fluoropolymer are compounded under low-shear with the extrusion screw at a revolution per minute of 200 or less.

12. The method as set forth in claim 1 further comprising compounding the first compounded mixture and a second portion of the first fluoropolymer to form a third compounded mixture.

13. The method as set forth in claim 12 wherein compounding the first compounded mixture and the second portion of the first fluoropolymer comprises compounding the first compounded mixture, the second portion of the first fluoropolymer, and a fourth fluoropolymer to form the third compounded mixture, wherein the fourth fluoropolymer is different than the first fluoropolymer.

14. The method as set forth claim 13 wherein the second portion of the first fluoropolymer and the fourth fluoropolymer are powder in form.

15. The method as set forth in claim 1 further comprising applying radiation to the layer to cure the layer.

16. The method as set forth in claim 15 wherein the radiation is applied to the layer via an electron beam.

17. The method as set forth in claim 1 further comprising maintaining a void volume in an extruder as the first compounded mixture is extruded.

18. The method as set forth in claim 7 wherein the first compounded mixture and the second compounded mixture are co-extruded to form the layer and the outer layer, respectively, thereby forming the layered tube.

19. The method as set forth in claim 7 further comprising applying radiation to the outer layer to cure the layered tube.

20. The method as set forth in claim 19 wherein the radiation is applied via an electron beam.

21. The method as set forth in claim 1 further comprising applying heat to the anti-static additive to remove moisture from the anti-static additive prior to premixing the anti-static additive and the first crosslinker.

22. The method as set forth in claim 1 wherein the first fluoropolymer comprises poly(ethylene-tetrafluoroethylene).

23. The method as set forth in claim 1 wherein the first crosslinker is a triallyl derivative of cyanuric acid.

24. The method as set forth in claim 7 wherein the second fluoropolymer comprises poly(ethylene-tetrafluoroethylene).

25. The method as set forth in claim 8 wherein the third fluoropolymer comprises poly(propylene-tetrafluoroethylene).

26. The method as set forth in claim 9 wherein the fourth fluoropolymer comprises poly(propylene-tetrafluoroethylene).

27. The method as set forth in claim 7 further comprising forming a hose assembly comprising the layered tube and a reinforcement layer constructed of para-aramid synthetic fibers.

28. The method as set forth in claim 27 wherein forming the hose assembly comprises providing an outer cover.

29. The method as set forth in claims 28 wherein forming the hose assembly comprises providing an adhesive layer between the reinforcement layer and the outer cover.

* * * * *